(12) United States Patent
Bergström

(10) Patent No.: US 11,685,247 B2
(45) Date of Patent: Jun. 27, 2023

(54) POWERTRAIN FOR A VEHICLE

(71) Applicant: VOLVO TRUCK CORPORATION, Gothenburg (SE)

(72) Inventor: Klas Bergström, Västra Frölunda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/769,431

(22) PCT Filed: Oct. 18, 2019

(86) PCT No.: PCT/EP2019/078343
§ 371 (c)(1),
(2) Date: Apr. 15, 2022

(87) PCT Pub. No.: WO2021/073748
PCT Pub. Date: Apr. 22, 2021

(65) Prior Publication Data
US 2023/0142860 A1 May 11, 2023

(51) Int. Cl.
*F16H 3/72* (2006.01)
*B60K 1/02* (2006.01)

(52) U.S. Cl.
CPC ............ *B60K 1/02* (2013.01); *F16H 3/725* (2013.01); *B60Y 2200/145* (2013.01); *B60Y 2400/73* (2013.01); *F16H 2200/0021* (2013.01)

(58) Field of Classification Search
CPC ... B60K 1/02; F16H 3/725; F16H 2200/0021; B60Y 2200/145; B60Y 2400/73
See application file for complete search history.

(56) References Cited

U.S. PATENT DOCUMENTS 4,685,354 A * 8/1987 McCabria ............... H02K 7/10
475/5

FOREIGN PATENT DOCUMENTS

| CN | 104015600 A | 9/2014 |
|----|-------------|--------|
| CN | 106382349 A | 2/2017 |

(Continued)

OTHER PUBLICATIONS

International Search Report and Written Opinion for International Patent Application No. PCT/EP2019/078343, dated Jan. 28, 2020, 10 pages.

(Continued)

*Primary Examiner* — Justin Holmes
(74) *Attorney, Agent, or Firm* — Sage Patent Group

(57) ABSTRACT

A vehicle powertrain comprising a first and second electric machines, and a transmission arranged to transmit torque from said electric machines to a driving axle, the transmission comprising:
  first and second input shafts arranged to be driven by the machines, respectively,
  a common output shaft,
  a first gear set comprising:
first and second input gears via which torque is transmittable from the respective input shafts to the output shaft;
  a second gear set comprising:
third and fourth input gears via which torque is transmittable from the respective input shafts to the output shaft;
  means for disconnecting each machine from each other and from the output shaft
  an intermediate shaft drivable by the first and/or the second input gear; and
  an auxiliary gear set having two gear ratios arranged between the intermediate and common output shafts, at (Continued)

least the first gear set being arranged to drive the output shaft via the intermediate shaft and the auxiliary gear set.

10 Claims, 2 Drawing Sheets

(56) References Cited

FOREIGN PATENT DOCUMENTS

| | | | | |
|---|---|---|---|---|
| CN | 206329683 U | * | 7/2017 | |
| CN | 104948716 B | | 9/2017 | |
| CN | 207864586 U | * | 9/2018 | |
| EP | 3530983 A1 | | 8/2019 | |
| WO | WO-0183249 A2 | * | 11/2001 | ............ B60K 6/365 |
| WO | 2017095298 A1 | | 6/2017 | |

OTHER PUBLICATIONS

International Preliminary Report on Patentability for International Patent Application No. PCT/EP2019/078343, dated Feb. 9, 2022, 13 pages.

* cited by examiner

POWERTRAIN FOR A VEHICLE

CROSS REFERENCE TO RELATED APPLICATIONS

This application is a 35 U.S.C. § 371 national stage application of PCT International Application No. PCT/EP2019/078343 filed on Oct. 18, 2019, the disclosure and content of which is incorporated by reference herein in their entireties.

TECHNICAL FIELD

The invention relates to a powertrain for a vehicle. The invention also relates to a vehicle comprising the powertrain, in particular an electrically operated vehicle.

The invention can be applied in heavy-duty vehicles, such as trucks, buses and construction equipment. Although the invention will be described with respect to a truck, the invention is not restricted to this particular vehicle, but may also be used in other vehicles such as buses, trailers, wheel loaders, excavators, passenger cars, etc.

BACKGROUND

A powertrain of an electrically operated vehicle may have many different configurations. For smaller vehicles, it is common that the powertrain comprises a single electric machine.

Since the relative speed range of an electric machine is generally larger than that of an internal combustion engine, it is usually possible to reduce the number of available gear ratios in comparison with transmissions used for torque conversion in powertrains with internal combustion engines. However, for heavy vehicles, it may be desirable to provide more than one electric machine for propulsion of the vehicle, enabling the usage of smaller electric machines. In such powertrains, a common transmission may be provided, transmitting torque from each one of the electric machines to a common output shaft used to propel a driving axle of the vehicle.

US 2009/0019967 discloses a powertrain including two electric machines. A transmission is provided, enabling torque transfer from each of the electric machines to a common output shaft for driving the vehicle. Each electric machine is connected to a corresponding input shaft, on which input gears are provided for selective transmission of torque via corresponding output gears provided on the common output shaft.

There is an ongoing strive to improve the powertrains of electrically operated vehicles and combine powertrain efficiency with a broad power range.

SUMMARY

A primary object of the invention is to provide an in at least some aspect improved powertrain for an electrically operated vehicle. In particular, it is an object to provide such a powertrain by means of which a total high powertrain efficiency in combination with good start and hill climbing abilities are achieved. Another objective is to provide a powertrain enabling efficient usage of relatively small electric machines. Yet another objective is to provide a powertrain in which loss of tractive power during gearshifts can be minimised.

According to a first aspect of the invention, at least the primary object is achieved by a powertrain for a vehicle according to claim 1. The powertrain comprises a first electric machine, a second electric machine, and a transmission arranged to transmit torque from said electric machines to at least one driving axle of the vehicle, the transmission comprising:
  a first input shaft and a second input shaft, wherein the first input shaft is arranged to be driven by the first electric machine and wherein the second input shaft is arranged to be driven by the second electric machine,
  a common output shaft configured to drive the at least one driving axle,
  a first primary gear set comprising:
    a first input gear via which torque is selectively transmittable from the first input shaft to the common output shaft; and
    a second input gear via which torque is selectively transmittable from the second input shaft to the common output shaft;
  a second primary gear set comprising:
    a third input gear via which torque is selectively transmittable from the first input shaft to the common output shaft; and
    a fourth input gear via which torque is selectively transmittable from the second input shaft to the common output shaft, and
  means for selectively disconnecting each one of the electric machines from the other one of the electric machines and from the output shaft.

The transmission further comprises:
  an intermediate shaft arranged to be selectively drivable by at least the first input gear and/or the second input gear, and
  an auxiliary gear set having at least two selectable gear ratios, the auxiliary gear set being arranged between the intermediate shaft and the common output shaft so that at least the first input gear and the second input gear are arranged to drive the common output shaft via the intermediate shaft and the auxiliary gear set.

The auxiliary gear set provides a range gear by means of which at least a high speed range and a low speed range are provided. This significantly extends a ratio span of the transmission and a speed range of the powertrain. The configuration of the transmission enables shifting at least within the respective high speed range and low speed range without losing traction, since one of the electric machines may drive the output shaft, directly or indirectly, while shifting gears for torque transmission from the other electric machine within the speed range. Generally, electric machines are able to temporarily deliver a higher torque than they are able to deliver continuously. The power output from the driving electric machine may therefore temporarily be increased while shifting gears for the other, temporarily disconnected, electric machine, so that loss of driving torque during shifting is avoided. Gear ratios of the gear sets may be designed such that, during shifting, the driving electric machine is in a speed range with high available power, good efficiency and not close to speed limitations. The gear ratio for any given gear set may be understood as a number of teeth on the output gear divided by a number of teeth on the input gear.

The gear ratios may further be designed so that, when a small tractive power is required for driving the vehicle, such as when driving at a constant cruising speed on a horizontal road, the first or the second electric machine may be disconnected while the remaining electric machine drives the vehicle at a speed and torque range giving high efficiency and enough power to maintain the cruising speed. The gear ratios may further be configured so that all the electric machines can deliver full power, or nearly full power, when torque is transmitted simultaneously via all the input shafts, i.e. when all the electric machines are used for driving of the vehicle.

The powertrain may comprise more than two electric machines and more than two input gears per primary gear set, such as three electric machines, three input shafts and three input gears per primary gear set. The electric machines may be electric machines of the same type or of different types. The electric machines may for example be brushless electric DC motors. The electric machines are preferably configured to work both as motors and generators in both directions of rotation.

The first and third input gears may be arranged axially offset with respect to each other on the first input shaft. Likewise, the second and fourth input gears may be arranged axially offset with respect to each other on the second input shaft.

The first primary gear set may further comprise a first output gear provided on the intermediate shaft, the first output gear being arranged to be driven by each one of the first and the second input gears. The first output gear may thus be driven by both the first and the second input gears in common, or by either one of the first and the second input gears. Thereby, one or both electric machines may be used to drive the output shaft.

The first output gear may be rotationally fixed to the intermediate shaft. In other words, the first output gear may be arranged for common rotation with the intermediate shaft.

The intermediate shaft may further be configured to be selectively drivable by the third input gear and/or the fourth input gear. A four-plus-four (4+4) speed configuration may hereby be achieved, in which four low speed gear ratios are achievable using a low range gear of the auxiliary gear set and in which four high speed gear ratios are achievable using a high range gear of the auxiliary gear set. Shifting gears within each one of the high speed range and the low speed range may in this configuration be achieved without complete loss of traction.

The second primary gear set may further comprise a second output gear provided on the intermediate shaft, the second output gear being arranged to be driven by each one of the third and fourth input gears. The second output gear may thus be driven by both the third and the fourth input gears in common, or by either one of the third and the fourth input gears. The second output gear may be rotationally fixed to the intermediate shaft, i.e. arranged for common rotation with the intermediate shaft.

The third input gear and the fourth input gear may be arranged to drive the common output shaft without any torque transmission via the auxiliary gear set. A six-speed configuration may hereby be achieved, in which four gears use the first primary gear set, the intermediate shaft and the auxiliary gear set for torque transmission, and in which two gears use the second primary gear set for direct torque transmission to the output shaft. When at least one of the gears of the second primary gear set is engaged, shifting of the auxiliary gear may thereby be carried out without losing traction. Thus, shifting without losing traction is possible through a complete speed range of the powertrain.

The second primary gear set may further comprise a second output gear provided on the output shaft, the second output gear being arranged to be driven by each one of the third and fourth input gears. The second output gear may be rotationally fixed to the output shaft.

When the third input gear and the fourth input gear are arranged to drive the common output shaft without any torque transmission via the auxiliary gear set, a gear ratio of each one of the first and second input gears may be smaller than a gear ratio of each one of the third and fourth input gears. In this way, the gear ratios of the first primary gear set, transmitting torque via the intermediate shaft, is smaller than the gear ratios of the second primary gear set, transmitting torque directly to the output shaft. Thus, a six-speed configuration may be achieved, in which lowest and highest gears use the first primary gear set, the intermediate shaft and the auxiliary gear set for torque transmission, and in which intermediate gears use the second primary gear set for direct torque transmission to the output shaft. This ensures a smooth transition between the different gears.

The auxiliary gear set may be arranged to be selectively settable to a position in which no torque is transmittable between the intermediate shaft and the output shaft. This enables transfer of mechanical power between the two electric machines, independently of vehicle movement.

The powertrain may further comprise a first primary shifting device for shifting between at least:
 a first gear position, in which torque is transmittable from the first electric machine to the output shaft via the first input gear, and
 a third gear position, in which torque is transmittable from the first electric machine to the output shaft via the third input gear.

In the first gear position, the third input gear may be freely rotatable with respect to the first input shaft. Likewise, in the third input gear position, the first input gear may be freely rotatable with respect to the first input shaft. Thus, the shifting device may be arranged to fix one of the first and third input gears for common rotation with the first input shaft. The shifting device may also be arranged with a neutral position, in which both of the first and third input gears rotate freely with respect to the first input shaft. Thus, the means for selectively disconnecting the first electric machine from the second electric machine and from the output shaft is provided by means of the first primary shifting device.

The powertrain may further comprise a second primary shifting device for shifting between at least:
 a second gear position, in which torque is transmittable from the second electric machine to the output shaft via the second input gear, and
 a fourth gear position, in which torque is transmittable from the second electric machine to the output shaft via the fourth input gear.

In the second gear position, the fourth gear may be freely rotatable with respect to the second input shaft. Likewise, in the fourth gear position, the second input gear may be freely rotatable with respect to the second input shaft. Thus, the shifting device may be arranged to fix one of the second and fourth gears for common rotation with the second input shaft. The shifting device may also be arranged with a neutral position, in which both of the second and fourth gears rotate freely with respect to the second input shaft. Thus, the means for selectively disconnecting the second electric machine from the first electric machine and from the output shaft is provided by means of the second primary shifting device.

The first and/or the second primary shifting devices may e.g. comprise dog clutches and actuation members, such as shift forks.

A gear ratio associated with the first input gear may be different from a gear ratio associated with the second input gear. In other words, a diameter of the first input gear may be different from a diameter of the second input gear, wherein an output gear with which the first and the second input gears are in engagement is the same. For example, the first and second input shafts may be provided at different distances from the intermediate shaft. Thus, the gear ratio selectable for torque transmission from the first electric machine via the first input gear is different from the gear ratio selectable for torque transmission from the second electric machine via the second input gear.

Furthermore, a gear ratio associated with the third input gear may be different from a gear ratio associated with the fourth input gear. In other words, a diameter of the third input gear is different from a diameter of the fourth input gear, wherein an output gear with which the third and the fourth gears are in engagement is the same. Thus, the gear ratio selectable for torque transmission from the first electric machine via the third input gear is different from the gear ratio selectable for torque transmission from the second electric machine via the fourth input gear.

Each one of the gears of the primary gear sets may be associated with a unique gear ratio. In other words, all gears of the primary gear sets may have different diameters. Preferably, the input and output gears are dimensioned such that one gear ratio for transmitting torque from the first electric machine is between two subsequent gear ratios for transmitting torque from the second electric machine, and vice versa. In this way, the transmission is configured to facilitate smooth gear shifts, since one of the electric machines may be used to propel the vehicle at an intermediate gear ratio while shifting between two subsequent gears for torque transmission from the other electric machine.

The auxiliary gear set may be a planetary gear set, providing a space efficient auxiliary gear set with two different gear ratios and an ability to mechanically disconnect the output shaft from the intermediate shaft and thereby disable torque transmission between the electric machines and the output shaft.

According to a second aspect of the invention, at least the primary object is also achieved by a vehicle comprising a powertrain according to the first aspect. The vehicle may be a fully electrified vehicle, or a hybrid vehicle comprising also at least one combustion engine in addition to the first and second electric machines. Advantages and advantageous features of the vehicle according to the invention appear from the above description of the first aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
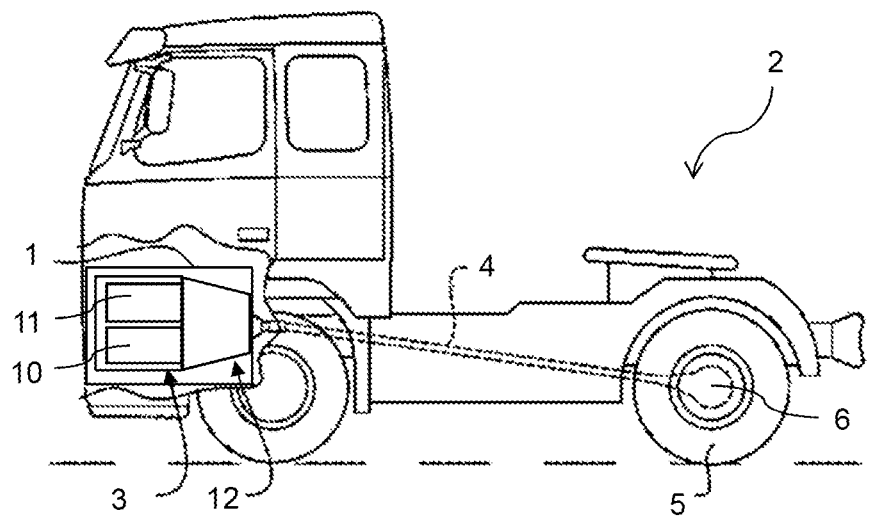
FIG. 1 schematically illustrates a vehicle according to an embodiment of the invention, FIG. 2 schematically illustrates a powertrain according to a first embodiment of the invention, and FIG. 3 schematically illustrates a powertrain according to a second embodiment of the invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

A vehicle 2 in the form of a truck according to an embodiment of the invention is schematically shown in FIG. 1. The vehicle 2 includes a powertrain 1 with an electric machine assembly 3 for propulsion of the vehicle 2. The electric machine assembly 3 comprises at least two electric machines 10, 11, connected to a transmission 12. The transmission 12 is arranged to transfer torque from the electric machine assembly 3 to a drive shaft 4 connecting the transmission 12 to a driving axle 6 that drives driving wheels 5 of the vehicle 2. Thus, in the shown embodiment, the vehicle 2 is a fully electrified vehicle configured to be driven solely by the electric machine assembly 3. The vehicle 2 may be arranged with more than one driving axle, such as two or more driving axles. The electric machine assembly 3 of the vehicle 2 may comprise more than two electric machines, such as three or four electric machines. The vehicle may also be a hybrid vehicle, provided with a combustion engine in addition to the electric motor assembly 2. The electric machines may be in the form of electric motors/generators.

Figure 2:
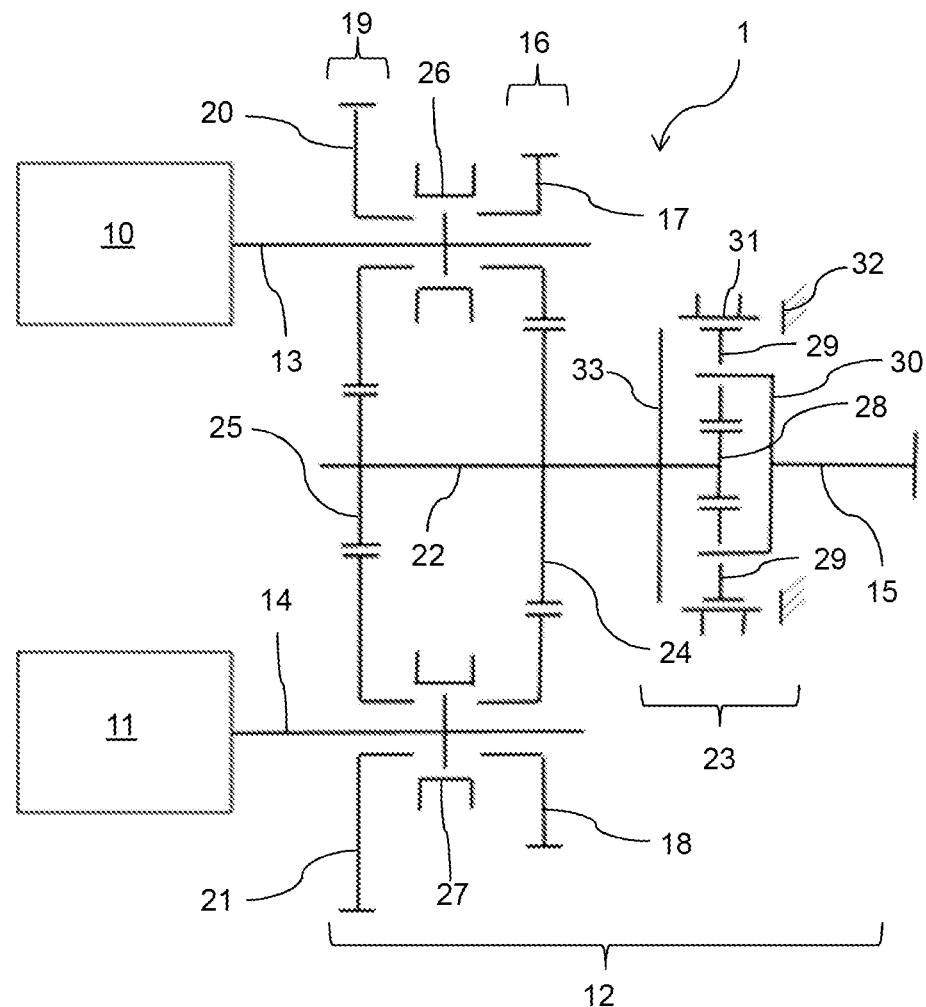

FIG. 2 schematically illustrates a powertrain 1 for an electrically operated vehicle 2 according to a first embodiment of the invention. In this embodiment, the powertrain 1 comprises an electric machine assembly with two electric machines 10, 11, namely a first electric machine 10 and a second electric machine 11. The powertrain 1 further comprises a transmission 12 arranged to transmit torque from the electric machines 10, 11 to one or more driving axle(s) of the vehicle. The transmission 12 has a first input shaft 13 arranged to be driven by the first electric machine 10 and a second input shaft 14 arranged to be driven by the second electric machine 11. The transmission 12 has a common output shaft 15 configured to drive the driving axle(s) of the vehicle.

A first primary gear set 16 of the transmission 12 comprises a first input gear 17 and a second input gear 18. Via the first input gear 17, torque is selectively transmittable from the first input shaft 13, connected to the first electric machine 10, to the common output shaft 15. Via the second input gear 18, torque is selectively transmittable from the second input shaft 14, connected to the second electric machine 11, to the common output shaft 15.

A second primary gear set 19 of the transmission 12 comprises a third input gear 20 and a fourth input gear 21. Via the third input gear 20, torque is selectively transmittable from the first input shaft 13 to the common output shaft 15. Via the fourth input gear 21, torque is selectively transmittable from the second input shaft 14 to the common output shaft 15.

The transmission 12 further comprises an intermediate shaft 22 on which a first output gear 24, forming part of the first primary gear set 16, and a second output gear 25, forming part of the second primary gear set 19, are rotationally fixed. Thus, the intermediate shaft 22 is arranged to be selectively drivable by any one of the gears 17, 18, 20, 21 of the primary gear sets 16, 19, or by a combination of two of those gears, one on each one of the input shafts 13, 14.

The transmission 12 further comprises first and second primary shifting devices 26, 27, by means of which it is possible to selectively disconnect each one of the electric machines 10, 11 from the intermediate shaft 22 and thereby also from the other one of the electric machines 10, 11 and from the common output shaft 15.

The transmission 12 also comprises an auxiliary gear set 23 having two selectable gear ratios. The auxiliary gear set 23 is arranged between the intermediate shaft 22 and the common output shaft 15. Thereby, the first input gear 17, the second input gear 18, the third input gear 20 and the fourth input gear 21 are all arranged to drive the common output shaft 15 via the intermediate shaft 22 and the auxiliary gear set 23. The auxiliary gear set 23 is herein in the form of a planetary gear set.

The first primary shifting device 26 is arranged for selecting a torque path for torque originating from the first electric machine 10 by shifting between three different positions. In a first gear position, the first primary shifting device 26 connects the first input gear 17 for common rotation with the first input shaft 13 so that torque from the first electric machine 10 is transmitted to the common output shaft 15 via the first input gear 17, the first output gear 24, the intermediate shaft 22 and the auxiliary gear set 23. In a third gear position, the first primary shifting device 26 connects the third input gear 20 for common rotation with the first input shaft 13 so that torque from the first electric machine 10 is transmitted to the common output shaft 15 via the third input gear 20, the second output gear 25, the intermediate shaft 22 and the auxiliary gear set 23. In a disengaging position, the first and third input gears 17, 20 are both allowed to rotate freely with respect to the first input shaft 13, so that no torque is transmitted between the first electric machine 10 and the intermediate shaft 22. In the first gear position, the third input gear 20 is freely rotatable with respect to the first input shaft 13. Likewise, in the third gear position, the first input gear 17 is freely rotatable with respect to the first input shaft 13.

The second primary shifting device 27 is arranged for selecting a torque path for torque originating from the second electric machine 11 by shifting between three different positions. In a second gear position, the second primary shifting device 27 connects the second input gear 18 for common rotation with the second input shaft 14 so that torque from the second electric machine 11 is transmitted to the common output shaft 15 via the second input gear 18, the first output gear 24, the intermediate shaft 22 and the auxiliary gear set 23. In a fourth gear position, the second primary shifting device 27 connects the fourth input gear 21 for common rotation with the second input shaft 14 so that torque from the second electric machine 11 is transmitted to the common output shaft 15 via the fourth input gear 21, the second output gear 25, the intermediate shaft 22 and the auxiliary gear set 23. In a disengaging position, the second and fourth input gears 18, 21 are both allowed to rotate freely with respect to the second input shaft 14, so that no torque is transmitted between the second electric machine 11 and the intermediate shaft 22. In the second gear position, the fourth input gear 21 is freely rotatable with respect to the second input shaft 14. Likewise, in the fourth gear position, the second input gear 18 is freely rotatable with respect to the second input shaft 14.

Each one of the gears 17, 18, 20, 21 of the primary gear sets 16, 19 is associated with a unique gear ratio. This is in the shown embodiment achieved by providing the gears 17, 18, 20, 21 as gear wheels with different diameters and by also providing the output gears 24, 25 as gear wheels with different diameters, such that a centre-to-centre distance between the first input gear 17 and the first output gear 24 is equal to a centre-to centre distance between the third input gear 20 and the second output gear 25, and likewise for the second and fourth input gears 18, 21. The distance between the first input shaft 13 and the intermediate shaft 22 may however differ from the distance between the second input shaft 14 and the intermediate shaft 22.

The first and second primary gear sets 16, 19 are arranged so that the first output gear 24 has a larger diameter than the second output gear 25 and so that the diameter of the input gears increases stepwise from the first input gear 17, providing relatively high torque, to the fourth input gear 21, providing relatively low torque. Thus, the gear ratios of the second primary gear set 19 are smaller than the gear ratios of the first primary gear set 16.

The auxiliary gear set 23 comprises a sun gear 28 rotationally fixed to the intermediate shaft 22, planetary gears 29 that are in engagement with the sun gear 28 and that are carried by a planetary gear carrier 30, which is rotationally fixed to the output shaft 15, and a ring gear 31, which is in engagement with the planetary gears 29. The ring gear 31 is by means of an auxiliary shifting device (not shown) transferable in an axial direction between a high speed range position, an open position, and a low speed range position. In the high speed range position, the ring gear 31 and the sun gear 28, and thereby also the planetary gear carrier 30, are locked for common rotation by a locking member 33. The common output shaft 15 and the intermediate shaft 22 are thereby locked for common rotation and direct transfer of torque. In the open position, the ring gear 31 is allowed to rotate freely with respect to the sun gear 28 and the planetary gear carrier, so that no torque is transmitted between the intermediate shaft 22 and the output shaft 15. In the low speed range position, the ring gear 31 is locked to a housing 32, whereby torque transmitted from the intermediate shaft 22 to the output shaft 15 via the sun gear 28, the planetary gears 29 and the planetary gear carrier 30 is amplified and whereby a rotational speed of the output shaft 15 is reduced relative to the intermediate shaft 22. Thus, by means of the auxiliary gear set 23, it is possible to shift between a high speed range, a low speed range, and an open transmission. Consequently, the transmission 12 of the powertrain 1 in the embodiment shown in FIG. 2 is a 4+4 speed transmission, with four low speed range gears and four high speed range gears.

In an exemplary driving scenario, the vehicle is started using electric power from both electric machines 10, 11. Torque is simultaneously transmitted via the first input gear 17 and the second input gear 18, which are both connected for torque transmission to the intermediate shaft 22 by means of the primary shifting devices 26, 27 and the first output gear 24. The auxiliary gear set 23 is in the low speed range position so that torque transmitted to the output shaft 15 is amplified by the auxiliary gear set 23. As the speed of the vehicle is increased, while torque is continuously transmitted from the second electric machine 11 via the second input gear 18, the first primary shifting device 26 is first moved to the disengaging position, and thereafter to the third gear position, connecting the third input gear 20 for torque transmission to the intermediate shaft 22 via the second output gear 25. In a next step, while transmitting torque from the first electric machine 10 via the third input gear 20, the second primary shifting device 27 is moved to the disengaging position, and thereafter to the fourth gear position. In a next step, to shift the auxiliary gear set 23, the electric machines 10, 11, are controlled not to generate any output torque, and the first and secondary primary shifting devices 26, 27 are moved to the disengaging positions. The auxiliary gear set 23 is now shifted to its high speed range position, and the first and second primary shifting devices 26, 27 are thereafter moved to the first and second gear positions, respectively. During shifting of the auxiliary gear set 23, there is a short discontinuation in torque transfer to the output shaft 15. The above explained shifting scheme may now be repeated with the auxiliary gear set 23 set to the high speed range position.

Mechanical power may in the first embodiment be transmitted between the first and second electric machines 10, 11 via either the first primary gear set 16 or the second primary gear set 19, or via a combination of gears from both primary gear sets 16, 19, as long as the auxiliary gear set 23 is set to the open position.

Figure 3:
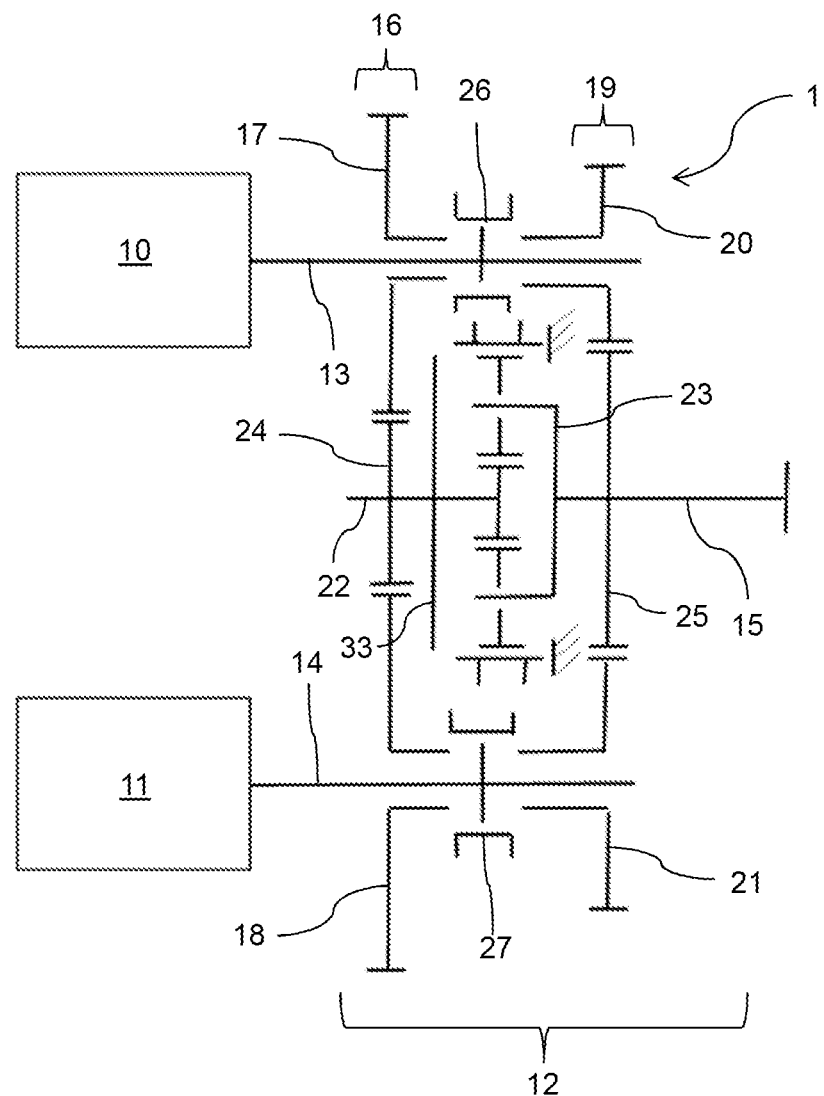

FIG. 3 schematically illustrates a powertrain 1 according to a second embodiment of the invention. The individual components of the powertrain 1 are the same as in the first embodiment. However, the powertrain 1 of the second embodiment differs from the powertrain 1 of the first embodiment in the positioning and the sizing of the components.

In the second embodiment, the auxiliary gear set 23 is provided between the first and the second primary gear sets 16, 19. Thus, while the first and second input gears 17, 18 are arranged to drive the first output gear 24 provided on the intermediate shaft 22, the third and fourth input gears 20, 21 are arranged to drive the second output gear 25, which is in this embodiment rotationally fixed on the output shaft 15.

With the first primary shifting device 26 in the first gear position, torque is transmitted from the first electric machine 10, via the first input shaft 13, the first input gear 17, the first output gear 24, the intermediate shaft 22, and the auxiliary gear set 23 to the common output shaft 15. With the first primary shifting device 26 in the third gear position, torque is instead transmitted from the first electric machine 10, via the first input shaft 13, the third input gear 20 and the second output gear 25 to the common output shaft 15, without using the auxiliary gear set 23. Similarly, with the second primary shifting device 27 in the second gear position, torque is transmitted from the second electric machine 11, via the second input shaft 14, the second input gear 18, the first output gear 24, the intermediate shaft 22, and the auxiliary gear set 23 to the common output shaft 15. With the second primary shifting device 27 in the fourth gear position, torque is instead transmitted from the second electric machine 11, via the second input shaft 14, the fourth input gear 21 and the second output gear 25 to the common output shaft 15. In this embodiment, the transmission 12 is therefore a six speed transmission, with two low speed gears using the low speed range position of the auxiliary gear set 23 and the first primary gear set 16, two intermediate speed gears that surpass the auxiliary gear set 23 and use the second primary gear set 19, and two high speed gears using the high speed range position of the auxiliary gear set 23 and the first primary gear set 16. In the shown embodiment, the lowest and highest speed gears both use the first primary gear set 16, while the intermediate gears use the second primary gear set 19, having higher gear ratios than the first primary gear set 16. This enables a smooth gear shifting over the entire range of gears without losing traction.

In the second embodiment, mechanical power may be transmitted between the first and second electric machines 10, 11 via the first primary gear set 16, with the auxiliary gear set 23 set to the open position.

It is to be understood that the present invention is not limited to the embodiments described above and illustrated in the drawings; rather, the skilled person will recognize that many changes and modifications may be made within the scope of the appended claims.

The invention claimed is:

1. A powertrain for a vehicle, the powertrain comprising a first electric machine, a second electric machine, and a transmission arranged to transmit torque from said electric machines to at least one driving axle of the vehicle, the transmission comprising:
   a first input shaft and a second input shaft, wherein the first input shaft is arranged to be driven by the first electric machine and wherein the second input shaft is arranged to be driven by the second electric machine,
   a common output shaft configured to drive the at least one driving axle,
   a first primary gear set comprising:
      a first input gear via which torque is selectively transmittable from the first input shaft to the common output shaft; and
      a second input gear via which torque is selectively transmittable from the second input shaft to the common output shaft;
   a second primary gear set comprising:
      a third input gear via which torque is selectively transmittable from the first input shaft to the common output shaft; and
      a fourth input gear via which torque is selectively transmittable from the second input shaft to the common output shaft,
   means for selectively disconnecting each one of the electric machines from the other one of the electric machines and from the output shaft,
   a first primary shifting device for shifting between at least:
      a first gear position, in which torque is transmittable from the first electric machine to the output shaft via the first input gear, and
      a third gear position, in which torque is transmittable from the first electric machine to the output shaft via the third input gear,
   a second primary shifting device for shifting between at least:
      a second gear position, in which torque is transmittable from the second electric machine to the output shaft via the second input gear, and
      a fourth gear position, in which torque is transmittable from the second electric machine to the output shaft via the fourth input gear,
   wherein the transmission further comprises:
   an intermediate shaft arranged to be selectively drivable by at least the first input gear and/or the second input gear,
   an auxiliary gear set having two selectable gear ratios, the auxiliary gear set being arranged between the intermediate shaft and the common output shaft so that at least the first input gear and the second input gear are arranged to drive the common output shaft via the intermediate shaft and the auxiliary gear set; and
   wherein the first primary gear set further comprises a first output gear provided on the intermediate shaft, the first output gear being arranged to be driven by each one of the first and the second input gears,
   wherein the third input gear and the fourth input gear are arranged to drive the common output shaft without any torque transmission via the auxiliary gear set, the second primary gear set further comprising a second output gear provided on the output shaft, the second output gear being arranged to be driven by each one of the third and fourth input gears.

2. The powertrain according to claim 1, wherein the first output gear is rotationally fixed to the intermediate shaft.

3. The powertrain according to claim 1, wherein a gear ratio of each one of the first and second input gears is smaller than a gear ratio of each one of the third and fourth input gears.

4. The powertrain according to claim 1, wherein the second output gear is rotationally fixed to the output shaft.

5. The powertrain according to claim 1, wherein the auxiliary gear set is arranged to be selectively settable to a position in which no torque is transmittable between the intermediate shaft and the output shaft.

6. The powertrain according to claim 1, wherein a gear ratio associated with the first input gear is different from a gear ratio associated with the second input gear.

7. The powertrain according to claim 1, wherein a gear ratio associated with the third input gear is different from a gear ratio associated with the fourth input gear.

8. The powertrain according to claim 1, wherein each one of the gears of the primary gear sets is associated with a unique gear ratio.

9. The powertrain according to claim 1, wherein the auxiliary gear set is a planetary gear set.

10. A vehicle comprising a powertrain according to claim 1.

* * * * *